(12) United States Patent
Poirot-Crouvezier

(10) Patent No.: US 10,741,852 B2
(45) Date of Patent: Aug. 11, 2020

(54) BIPOLAR PLATE FOR AN ELECTROCHEMICAL REACTOR WITH A COMPACT HOMOGENIZATION ZONE AND A LOW PRESSURE DIFFERENTIAL

(71) Applicant: COMMISSARIAT A L'ENERGIE ATOMIQUE ET AUX ENERGIES ALTERNATIVES, Paris (FR)

(72) Inventor: Jean-Philippe Poirot-Crouvezier, Saint Georges de Commiers (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 327 days.

(21) Appl. No.: 15/324,191

(22) PCT Filed: Jul. 16, 2015

(86) PCT No.: PCT/FR2015/051956
§ 371 (c)(1),
(2) Date: Jan. 5, 2017

(87) PCT Pub. No.: WO2016/009154
PCT Pub. Date: Jan. 21, 2016

(65) Prior Publication Data
US 2017/0214063 A1 Jul. 27, 2017

(30) Foreign Application Priority Data
Jul. 17, 2014 (FR) ...................................... 14 56917

(51) Int. Cl.
*H01M 8/026* (2016.01)
*H01M 8/241* (2016.01)
(Continued)

(52) U.S. Cl.
CPC ......... *H01M 8/026* (2013.01); *H01M 8/0258* (2013.01); *H01M 8/241* (2013.01);
(Continued)

(58) Field of Classification Search
CPC .... H01M 8/026; H01M 8/0258; H01M 8/241; H01M 8/0267
See application file for complete search history.

(56) References Cited

U.S. PATENT DOCUMENTS

2003/0129473 A1   7/2003  Lee et al.
2008/0070080 A1   3/2008  Miyazaki
(Continued)

FOREIGN PATENT DOCUMENTS

DE   10 2004 058 177 A1   6/2006
JP        2006-12466 A    1/2006
WO       2006/064661 A1   6/2006

OTHER PUBLICATIONS

International Search Report dated Oct. 6, 2015 in PCT/FR2015/051956 filed Jul. 16, 2015.

*Primary Examiner* — Eugenia Wang
(74) *Attorney, Agent, or Firm* — Oblon, McClelland, Maier & Neustadt, L.L.P.

(57) ABSTRACT

A bipolar plate for an electrochemical reactor is provided, including first and second opposing outer conductive faces, and including first flow channels formed on the first outer conductive face, extending in a same direction; first injection orifices formed in the first outer conductive face; and a first homogenization zone formed on the first outer conductive face and including homogenization channels, each connecting a first injection orifices to a plurality of the first flow channels, and each sub-dividing into a plurality of branches extending from the first injection orifice to one of the first flow channels.

16 Claims, 6 Drawing Sheets

(51) Int. Cl.
*H01M 8/0258* (2016.01)
*H01M 8/0206* (2016.01)
*H01M 8/0226* (2016.01)
*H01M 8/0213* (2016.01)
*H01M 8/0221* (2016.01)
*H01M 8/021* (2016.01)

(52) U.S. Cl.
CPC .......... *H01M 8/021* (2013.01); *H01M 8/0206* (2013.01); *H01M 8/0213* (2013.01); *H01M 8/0221* (2013.01); *H01M 8/0226* (2013.01)

(56) References Cited

U.S. PATENT DOCUMENTS

| | | |
|---|---|---|
| 2010/0239931 A1 | 9/2010 | Ishida et al. |
| 2014/0212782 A1 | 7/2014 | Ishida et al. |
| 2016/0118673 A1* | 4/2016 | Andreas-Schott .......................... H01M 8/0258 429/434 |

* cited by examiner

BIPOLAR PLATE FOR AN ELECTROCHEMICAL REACTOR WITH A COMPACT HOMOGENIZATION ZONE AND A LOW PRESSURE DIFFERENTIAL

The invention concerns electrochemical reactors including a stack of electrochemical cells and more particularly bipolar plates of a stack with proton exchange membranes. Electrochemical reactors of this kind constitute fuel cells or electrolyzers, for example.

Fuel cells are notably envisaged as a power source for motor vehicles mass produced in the future or as auxiliary power sources in aeronautics. A fuel cell is an electrochemical device that converts chemical energy directly into electrical energy. A fuel cell includes a stack of multiple cells in series. Each cell typically generates a voltage of the order of 1 volt and stacking them makes it possible to generate a power supply voltage at a higher level, for example of the order of one hundred volts.

Of known fuel cell types there may notably be cited the proton exchange membrane (PEM) fuel cell operating at low temperature. Fuel cells of this kind have particularly beneficial compactness properties. Each cell includes an electrolytic membrane allowing only the passage of protons and not the passage of electrons. The membrane includes an anode on a first face and a cathode on a second face to form a membrane/electrodes assembly (MEA).

At the anode, dihydrogen used as fuel is ionized to produce protons passing through the membrane. The membrane thus forms an ionic conductor. The electrons produced by this reaction migrate toward a flow plate and then through an electrical circuit external to the cell to form an electric current. At the level of the cathode, oxygen is reduced and reacts with the protons to form water.

The fuel cell may comprise a plurality of plates termed bipolar, for example of metal, stacked on one another. The membrane is disposed between two bipolar plates. The bipolar plates may comprise flow orifices and channels to guide the reagents and reaction products continuously to/from the membrane. The bipolar plates also comprise flow channels for guiding cooling liquid for evacuating the heat generated. The reaction products and the non-reactive species are evacuated by being entrained by the flow to the outlet of the network of flow channels. The flow channels of the various flows are separated by the bipolar plates in particular.

The bipolar plates are also electrically conductive to collect electrons generated at the level of the anode. The bipolar plates also have a mechanical function of transmitting forces for clamping up the stack, necessary for the quality of the electrical contact. Gas diffusion layers are disposed between the electrodes and the bipolar plates and are in contact with the bipolar plates.

Electronic conduction is achieved through the bipolar plates, ionic conduction being obtained through the membrane.

There are primarily three modes of circulation of the reagents in the flow channels:
 serpentine channels: one or more channels travel the whole of the active surface in a plurality of round trips.
 parallel channels: a bundle of parallel through-channels that cross the whole of the active surface. The flow channels can be rectilinear or undulate slightly.
 interdigitated channels: a bundle of parallel and blocked channels travels over the whole of the active surface. Each channel is blocked either on the fluid inlet side or on the fluid outlet side. The fluid entering a channel is then constrained to pass locally through the gas diffusion layer into an adjacent channel and thereafter reach the fluid outlet of that adjacent channel.

To promote compactness and performance, the design involves reducing the dimensions of the flow channels. The mode of circulation via parallel channels is then generally favored, to limit the head losses in small flow channels of this kind and to prevent problems with the flow of cooling liquid that can lead to hot spots.

With parallel flow channels, the distribution of the reagents to the electrodes must be as homogeneous as possible over the whole of their surface if the operation of the electrochemical reactor is not to be degraded. To this end, bipolar plates including parallel flow channels frequently use homogenization zones to connect inlet and outlet manifolds to the various flow channels of the bipolar plates. The reagents are brought into contact with the electrodes from inlet manifolds and the reaction products are evacuated from outlet manifolds connected to the various flow channels. The inlet manifolds and the outlet manifolds generally pass through the complete thickness of the stack. The inlet and outlet manifolds are usually produced by:
 respective orifices through each bipolar plate at its periphery;
 respective orifices through each membrane at its periphery;
 seals each disposed between a bipolar plate and a membrane. Each seal surrounds an orifice in its membrane and an orifice in its bipolar plate. The surface of contact with a membrane is generally flat so that this membrane remains flexible.

Various technical solutions are known for establishing communication between the inlet and outlet manifolds and the various flow channels. It is notably known to provide passages between two metal sheets of a bipolar plate. These passages discharge on the one hand into respective manifold orifices and on the other hand into injection orifices. A homogenization zone includes channels that establish communication between the injection orifices and the flow channels.

The homogenization zone includes: a cooling fluid transfer zone, an oxidizer circuit homogenization zone and a fuel circuit homogenization zone that are stacked and respectively discharge into a cooling liquid manifold, an oxidizer circuit manifold and a fuel circuit manifold. These three manifolds are necessarily offset to isolate them from one another, the homogenization channels of the fuel and oxidizer circuits having very different orientations.

The homogenization zone contributing only rarely to the electrochemical reaction, its size must be limited as much as possible so as not to degrade the compactness and the weight of the fuel cell. Consequently, the homogenization zone frequently features channels having a large angular deviation relative to the flow channels of the reactive zone of the electrodes, in order to gain in compactness. However, homogenization channels of this kind induce very disparate head losses. The pressures at the inlet or the outlet of the opposing flow channels can therefore vary greatly, to the detriment of the operation of the electrochemical reactor. To produce compact homogenization zones, a homogenization channel communicates with two or three flow channels. A greater number of flow channels per homogenization channel increases the head losses and the disparities between them.

The document US2010/0239931 describes a fuel cell structure. A bipolar plate defines inlet and outlet homogenization zones for the flow of oxygen oxidizer and the water generated. The inlet and outlet homogenization zones are connected by the flow channels of a reaction zone. In one embodiment, the homogenization zones include homogenization channels. The outlet homogenization channels are longer than the inlet homogenization channels. In this embodiment, homogenization channels are subdivided before they are joined to the flow channels.

It can be seen that the various homogenization channels do not have the same cross section, the reaction conditions then being heterogeneous according to the flow paths taken. Moreover, some parts of the homogenization zones are potentially subject to blocking by accumulated water.

The invention aims to resolve one or more of these disadvantages. The invention therefore relates to a bipolar plate as defined in the appended claims. The invention also relates to an electrochemical reactor as defined in the appended claims.

Other features and advantages of the invention will emerge clearly from the description thereof given hereinafter by way of illustrative and nonlimiting example and with reference to the appended drawings, in which.

Figure 1:
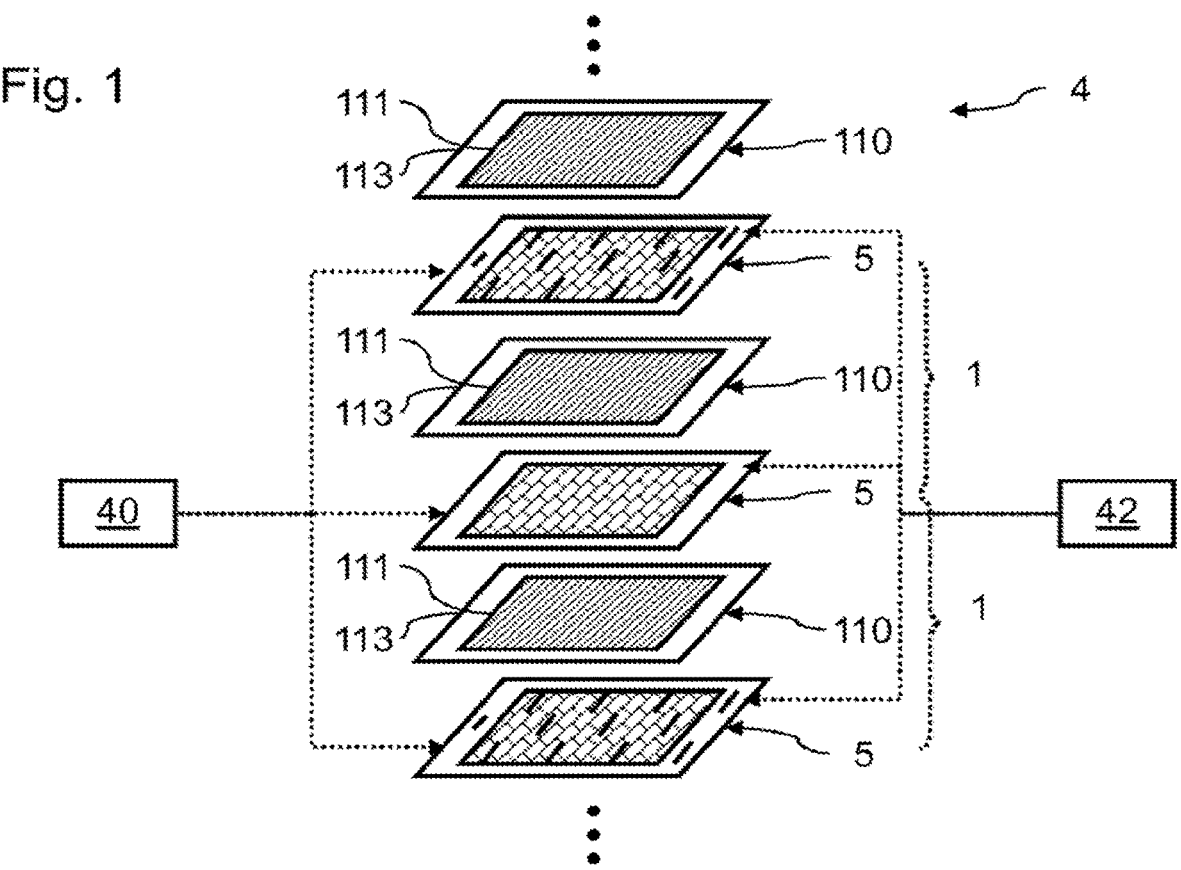
FIG. 1 is an exploded perspective view of one example of a stack of membrane/electrodes assemblies and bipolar plates for a fuel cell.

FIG. 1 is a diagrammatic exploded perspective view of a stack of cells 1 of a fuel cell 4. The fuel cell 4 includes a plurality of stacked cells 1. The cells 1 are of the proton exchange membrane or polymer electrolyte membrane type.

The fuel cell 4 includes a fuel source 40. Here, the fuel source 40 feeds an inlet of each cell 1 with dihydrogen. The fuel cell 4 also includes an oxidizer source 42. Here the oxidizer source 42 feeds an inlet of each cell 1 with air, the oxygen of the air being used as the oxidizer. Each cell 1 also includes exhaust channels. One or more cells 1 also have a cooling circuit.

Each cell 1 includes a membrane/electrodes assembly 110 or MEA 110. A membrane/electrodes assembly 110 includes an electrolyte layer 113, a cathode (not shown) and an anode 111 placed on respective opposite sides of and fixed to that electrolyte layer 113. The electrolyte layer 113 forms a semi-permeable membrane allowing proton conduction whilst being impermeable to the gases present in the cell. The electrolyte layer also prevents electrons passing between the anode 111 and the cathode.

Between the adjacent MEA of each pair is disposed a bipolar plate 5. Each bipolar plate 5 defines anode flow channels and cathode flow channels on opposite outer faces. Bipolar plates 5 advantageously also define cooling liquid flow channels between two successive membrane/electrodes assemblies. The bipolar plates 5 may each be formed in a manner known per se from two conductive metal sheets assembled together, for example of stainless steel, titanium alloy, aluminum alloy, nickel alloy or tantalum alloy. Each sheet then defines a respective outer face. The bipolar plates 5 may also be produced by any other process, for example molding or injection molding from carbon-polymer composites. The bipolar plates 5 can therefore be made in one piece. The outer faces of the bipolar plate 5 are then defined by such a one-piece component.

The stack may also comprise peripheral seals and membrane reinforcements not shown here. Each cell 1 may further comprise a gas diffusion layer (not shown) disposed between the anode and a bipolar plate and another gas diffusion layer disposed between the cathode and another bipolar plate.

In a manner known per se, when the fuel cell 4 is operating air flows between an MEA and a bipolar plate and dihydrogen flows between that MEA and another bipolar plate. At the level of the anode, the dihydrogen is ionized to produce protons that pass through the MEA. The electrons produced by this reaction are collected by a bipolar plate 5. The electrons produced are then applied to an electric load connected to the fuel cell 1 to form an electric current. At the level of the cathode, oxygen is reduced and reacts with the protons to form water. The reactions at the level of the anode and the cathode are governed as follows:

$H_2 \rightarrow 2H^+ + 2e^-$ at the level of the anode; 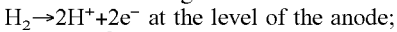
$4H^+ + 4e^- + O_2 \rightarrow 2H_2O$ at the level of the cathode. 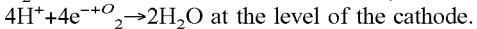

When it is operating, a cell of the fuel cell usually generates a DC voltage between the anode and the cathode of the order of 1 V.

Figure 2:
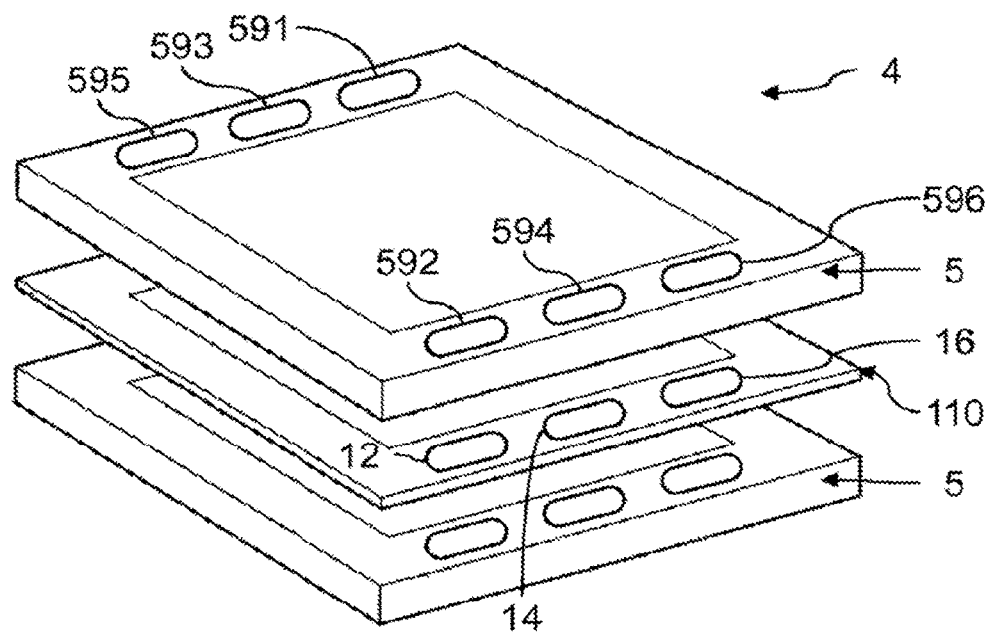
FIG. 2 is an exploded perspective view of bipolar plates and a membrane/electrodes assembly intended to be stacked to form flow manifolds through the stack.

FIG. 2 is a diagrammatic exploded perspective view of two bipolar plates 5 and a membrane/electrodes assembly intended to be included in the stack of the fuel cell 4. The stacking of the bipolar plates 5 and the membrane/electrodes assemblies 110 is intended to form a plurality of flow manifolds, the disposition of which is shown here only diagrammatically. To this end, respective orifices are made through the bipolar plates 5 and through the membrane/electrodes assemblies 110. The bipolar plates 5 therefore include orifices 591, 593 and 595 at the level of a first end and orifices 592, 594 and 596 at the level of a second end opposite the first. The orifice 591 serves for example to form a fuel feed manifold, the orifice 596 serves for example to form a combustion residues and unused fuel evacuation manifold, the orifice 593 serves for example to form a cooling liquid feed manifold, the orifice 594 serves for example to form a cooling liquid evacuation manifold, the orifice 592 serves for example to form an oxidizer feed manifold, and the orifice 595 serves for example to form an evacuation manifold for the water produced and unused oxidizer.

The orifices in the bipolar plates 5 and the membrane/electrodes assemblies 110 are disposed face-to-face in order to form the various flow manifolds. Orifices 12, 14 and 16 are for example arranged in the membrane/electrodes assemblies 110 and are disposed face-to-face with the orifices 592, 594 and 596, respectively. For simplicity, the orifice 596 will be treated as a manifold for evacuating combustion residues from the stack.

Figure 3:
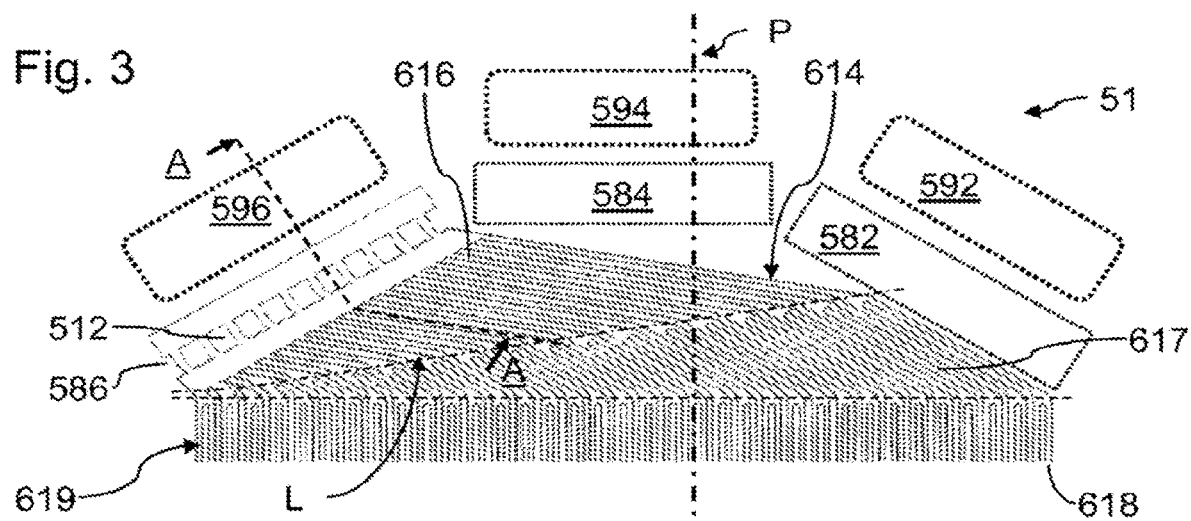
FIG. 3 is a partial top view of one face of a bipolar plate according to a first embodiment of the invention.
Figure 4:
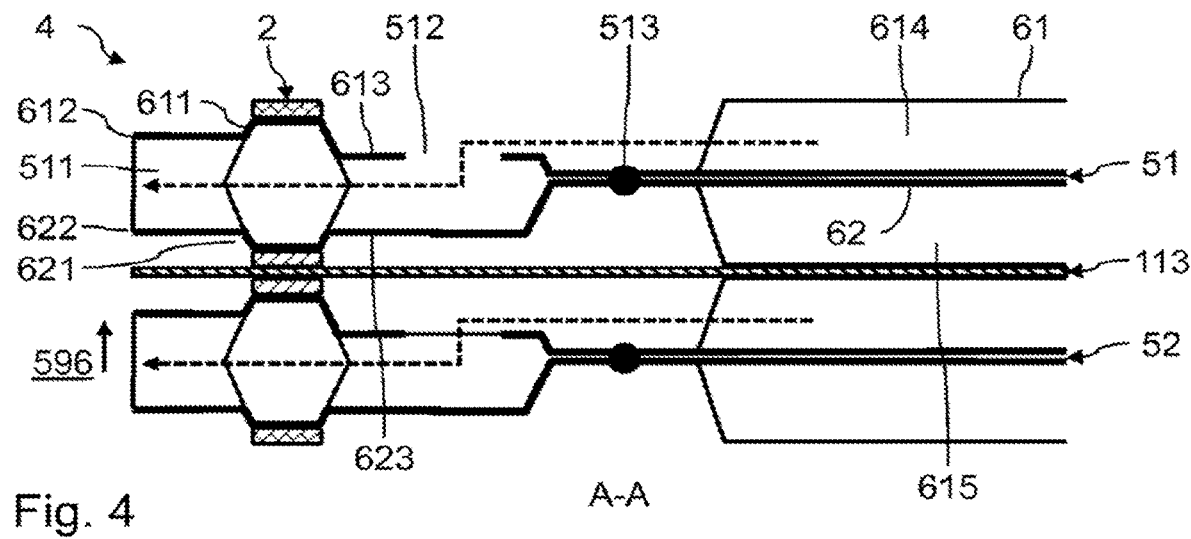
FIG. 4 is a sectional view of a stack including bipolar plates according to the invention.

FIG. 3 is a diagrammatic partial top view of a sheet 61 of one embodiment of a bipolar plate 5 according to the invention at the level of the manifolds 592, 594 and 596. FIG. 4 is a sectional view of a bipolar plate 51 of this kind stacked with another identical bipolar plate 52 and between which a membrane 113 of a membrane/electrodes assembly is disposed. Here the section shown is at the level of the combustion residues evacuation manifold 596.

Each of the bipolar plates 5, 51 and 52 shown includes two conductive sheets 61 and 62 fastened together. The conductive sheets 61 and 62 are advantageously made of stainless steel, a very common material suitable for numerous widely used industrial transformation processes, for example pressing, stamping and/or deep drawing. The conductive sheets 61 and 62 shown in FIG. 4 are fastened together by welds 513. The conductive sheets 61 and 62 have raised patterns so as to form fluid flow channels at the level of the outer faces of each bipolar plate and advantageously between the conductive sheets 61 and 62 inside each of those bipolar plates. Accordingly, for each bipolar plate, there are cooling liquid flow channels (not shown) between the conductive sheets 61 and 62, fuel flow channels 618 on an outer face of the sheet 61, and oxidizer and water flow channels (not shown) on an outer face of the sheet 62. Here the flow channels 618 are of parallel type and extend in the same direction. The oxidizer and cooling liquid flow channels are also advantageously of parallel type and extend in the same direction. These various flow channels are not necessarily straight (these channels may be corrugated), their direction being defined by a straight line segment connecting their inlet to their outlet.

In a manner that is known per se, the various manifolds passing through the stack communicate with respective injection zones. In the example shown in FIG. 3, the manifold 596 communicates with an injection zone 586, the manifold 594 communicates with an injection zone 584 and the manifold 592 communicates with an injection zone 582. Each injection zone includes respective injection orifices in communication with respective flow channels. The injection zones 586, 584 and 582 are offset laterally. The injection zones 582 and 586, including respective injection orifices, are notably disposed on respective opposite sides of a plane P perpendicular to their bipolar plate and including the direction of the flow channels 618 so as to be able to accommodate a plurality of manifolds at the level of the same end of a bipolar plate.

There are injection orifices 512 in the sheet 61 in the injection zone 586. As shown in FIG. 4, orifices 512 communicate with the manifold 596 via a passage 511:
  passing through ribs 612 and 622;
  passing through ribs 611 and 621 supporting seals 2, the ribs 611 and 621 surrounding the manifold 596; and
  passing through ribs 613 and 623.

The ribs 612 and 613 are arranged on respective opposite sides of the rib 611 in the sheet 61, the ribs 622 and 623 being arranged on respective opposite sides of the rib 621 in the sheet 62.

There is also fluid communication that is not described and not shown on the one hand between the manifold 594 and the injection zone 584 and on the other hand between the manifold 592 and the injection zone 582.

The injection orifices 512 of the injection zone 586 communicate with the flow channels 618 via a homogenization zone 614 that is also on the outer face of the sheet 61. A homogenization zone is generally distinguished from a reactive zone 619 including the flow channels 618:
  by the absence of any electrode overlying this modeling zone in the membrane-electrodes assembly; and/or
  by the presence of homogenization channels inclined relative to the flow channels 618 so as to make the homogenization zone 614 more compact.

The function of the homogenization zones 614 is notably to limit the flow rate differences between the various flow channels 618 and to homogenize the head losses for the various possible flow paths.

A homogenization zone is advantageously arranged in the outer face defined by the sheet 62 to establish communication between injection orifices of the injection zone 582 and flow channels of this outer face. This homogenization zone is advantageously superposed on the homogenization zone 615.

The homogenization zone 614 includes homogenization channels separated from one another by lateral walls. Each homogenization channel establishes communication between at least one orifice 512 and a plurality of flow channels 618. Feeding a plurality of flow channels 618 from the same homogenization channel generally makes it possible to make the homogenization zone 614 more compact. In order to produce a result of this kind without excessively degrading the flow rate differences between the flow channels that are the farthest apart and without inducing excessive pressure gradients at the inlet of flow channels, the invention proposes to subdivide homogenization channels into a plurality of branches, extending from an injection orifice 512 to a flow channel 618.

In the example shown, the homogenization zone 614 is divided into a homogenization zone 616 and a homogenization zone 617. The homogenization zone 616 forms a first section and includes homogenization channels into which the injection orifices 512 discharge. The homogenization zone 617 forms a second section including branches discharging into flow channels 618.

Each branch of the zone 617 advantageously discharges into a single channel of the zone 616. Any accumulation of water in the zone 616 is therefore more easily evacuated because:
  the flow in the flow channels 618 downstream of this potentially blocked channel must necessarily pass through this blocked channel, which guarantees that an unblocking pressure is applied to any accumulation of water;
  the homogeneity of the head losses between the various flow paths guarantees a sufficient pressure on any accumulation of water to favor unblocking.

Similarly, any accumulation of water in the zone 617 is more easily evacuated because the channel of the zone 616 into which the branches of the zone 617 discharge applies a homogeneous pressure to those branches. The homogeneous head losses of the flow paths passing through the various branches favors an unblocking pressure on any accumulation of water.

The line L shown makes it possible to situate the junctions between the homogenization channels of the zone 616 and their branches of the zones 617. Here a homogenization channel is divided into two branches at the level of a junction. A homogenization channel is advantageously divided into at most three branches at the level of a junction, in order not to increase excessively the head loss in the homogenization channels. Each of said junctions is advantageously disposed in its homogenization channel at a distance from an injection orifice 512 between 0.3*Lch and 0.7*Lch inclusive, where Lch is the length of the homogenization channel in which that junction is situated.

In the example shown, each branch of the zone 617 advantageously discharges into a plurality of flow channels 618. Each branch of the zone 617 advantageously discharges into at most three flow channels 618 in order not to increase the head losses in the zone 616.

As the homogenization channels of the zone 616 are less numerous than their branches in the zone 617, the homogenization channels of the zone 616 may have an inclination relative to the flow channels 618 greater than that of their branches. An increased inclination of this kind makes it possible to limit the size of the homogenization zone 614 and therefore to limit the overall sizes of the bipolar plate and the stack. The branches of the zone 617 are advantageously at an angle of at least 20° relative to the flow channels 618. The homogenization channels of the zone 616 are advantageously at an angle of at least 40° relative to the flow channels 618 and an angle of at least 20° relative to the branches of the zone 617. An inclination of the homogenization channels relative to the flow channels also makes it possible to use the same cross section for the flow channels and the homogenization channels, while the latter are less numerous. Likewise, an inclination of the channels of the first section relative to the branches of the second section makes possible a first section 10 with channels having the same cross section as the branches in the second section. By using the same cross sections it is possible to define easily the same flow conditions through all the flow paths, in particular when the shortest homogenization channels at the inlet are compensated by longer homogenization channels at the outlet of common flow channels.

Figure 5:
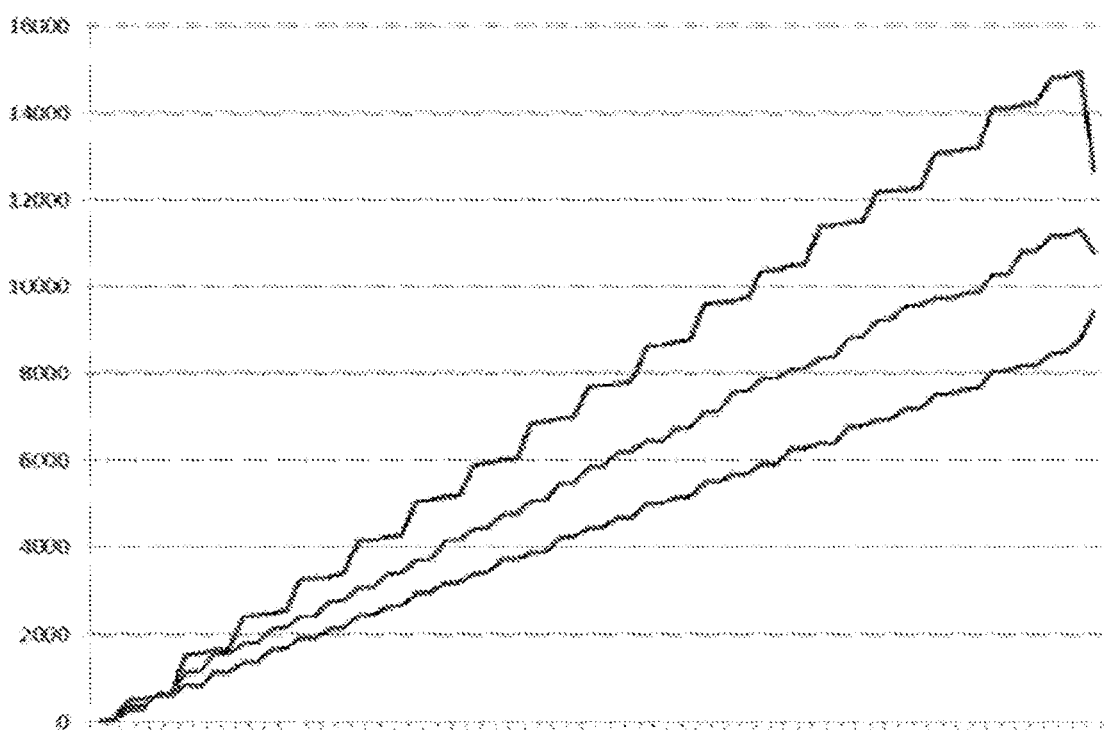
FIG. 5 is a diagram illustrating the inlet pressures at the level of different flow channels according to different configurations.

FIG. 5 is a diagram illustrating an outlet pressure differential of flow channels as a function of their transverse position. The abscissa corresponds to a channel index, the ordinate to a pressure difference in Pascals. FIG. 5 shows results of simulation with a prior art homogenization zone including homogenization channels with no junction feeding four flow channels (top curve), a prior art homogenization zone including homogenization channels with no junction feeding two flow channels (bottom curve) and a homogenization zone 614 according to the invention (middle curve). It is seen that a homogenization zone 614 according to the invention makes it possible to maintain a relatively small pressure disparity in the flow channels 618 whilst making it possible to reduce significantly its overall size.

The cross section of each of the homogenization channels in the zone 616 is advantageously identical to the cross section of each of the flow channels 618, which makes it possible to obtain maximum compactness with a maximum angle of inclination between the homogenization channels of the zone 616 and the flow channels 618. The same cross section between the homogenization channels of the zone 616 moreover makes it possible to achieve good control of the flow conditions and a homogenization of the flow conditions as described above. The cross section of the homogenization channels in the zone or section 616 is advantageously equal to the cross section of the branches in the zone or section 617, again to favor the control and the homogenization of the flow conditions.

The bipolar plate may include a homogenization zone for the oxidizer and water flow channels in vertical alignment with the homogenization zone 614, which may have a shape symmetrical to the homogenization zone 614 with respect to a straight line segment perpendicular to the bipolar plate and passing through its center. It is also possible to provide asymmetrical homogenization zones to take account of the head loss differences of the different flows. For example, the dihydrogen type fuel homogenization channels may have a greater inclination than the oxidizer homogenization channels. Thus the manifolds 592 and 594 shown in FIG. 3 may be interchanged, as illustrated in an example shown in FIG. 9.

Figure 6:
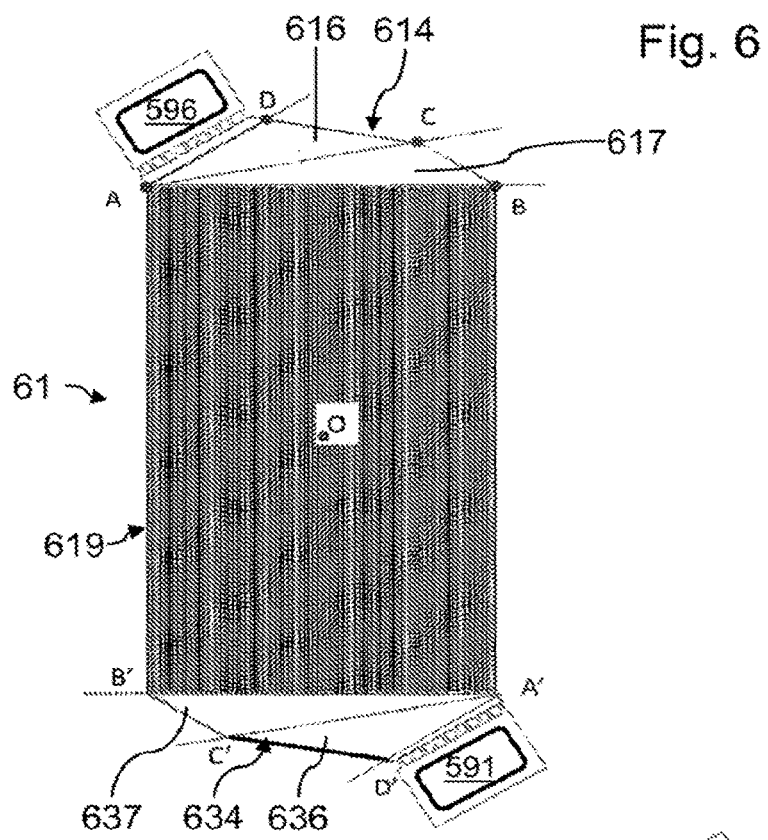
FIGS. 6 to 8 are top views of various bipolar plate sheets using different homogenization zone designs.

FIG. 6 is a top view of a variant bipolar plate making it possible to balance the head losses in the various flow paths that pass through the flow channels 618. A homogenization zone 634 is formed on the opposite side of the homogenization zone 614 relative to the flow channels 618 of the reaction zone 619. The homogenization zone 634 has a shape substantially symmetrical to the zone 614 with respect to an axis perpendicular to the bipolar plate. An axis of this kind is identified by the point O in this figure. Thus, a flow path that passes through any of the flow channels 618 is identical to the flow path that passes through the channel that is symmetrically positioned to it with respect to a median plane parallel to the plane P. The length of all the flow paths through the homogenization zone 614, the flow channels 618 and the homogenization zone 634 is advantageously identical. This kind of homogeneity of flow conditions is further reinforced by the same cross section in the various flow channels, homogenization channels and branches of the homogenization channels.

To take account of slightly different flow conditions between the inlet and the outlet of the flow paths (increased quantity of water, for example), the homogenization zone 614 can have a different geometry to the homogenization zone 634, for example with different angles of the homogenization channels in these two homogenization zones. Because of the angles between the channels and branches of the homogenization zones and the flow channels, some homogenization branches and channels are shorter than others. To maintain a very similar length between the flow paths at the ends of a flow channel, the shorter the homogenization branch and the channel of the zone 614 discharging into this flow channel, the longer the homogenization branch and the channel of the zone 634 discharging into this flow channel. In practice, for a given flow channel 618, the homogenization branch and the channel of the zone 614 and the homogenization branch and the channel of the zone 634 discharging into this flow channel 618 are positioned on opposite sides of a plane perpendicular to the bipolar plate and extending in the direction of that flow channel 618.

FIG. 6 shows a first design example of the geometry of a homogenization zone 614 or 634. This design makes it possible to optimize the compactness of the homogenization zones. In this example, a line A-B passes through the ends of the flow channels 618. A line A-C is drawn, secant to the line A-B at the point A. The junctions are arranged along the line A-C. The homogenization zone 617 is therefore positioned between the lines A-B and A-C, and more precisely delimited by a triangle ABC. In this example, a line A-D defines the junction between the injection zone 586 and the homogenization zone 616, this line being secant to the line A-B at the point A. The homogenization zone 616 is therefore positioned between the lines A-D and A-C and to be more precise delimited by a triangle ADC. Likewise, the homogenization zone 634 is divided into a homogenization zone 636 delimited by a triangle A'B'C' and a homogenization zone 637 delimited by a triangle A'D'C'. The injection zones for the cooling liquid and for the oxidizer may be positioned on the segments BC and CD, respectively, for example.

Figure 7:
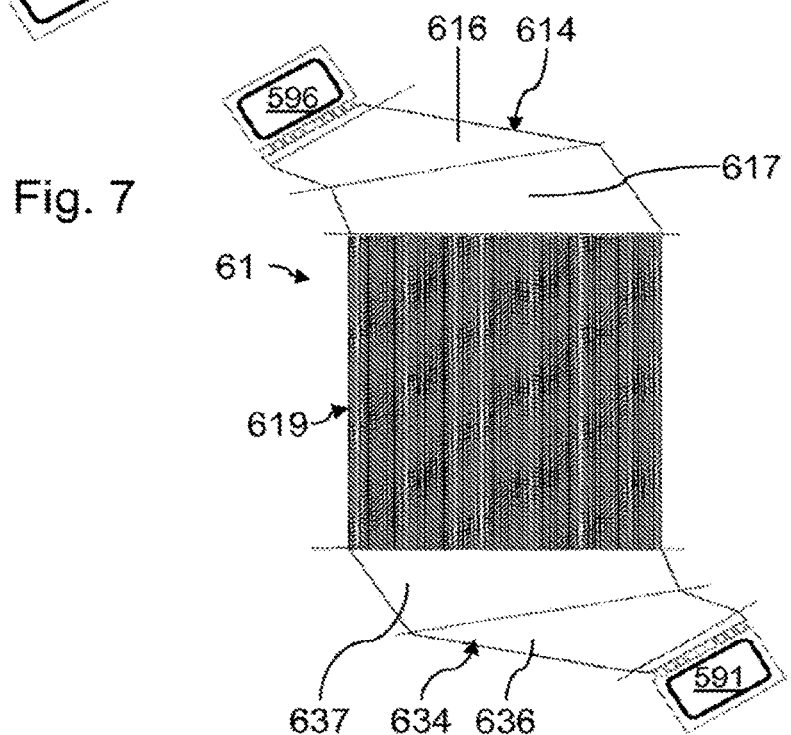

FIG. 7 shows a second design example of the geometry of a homogenization zone 614 or 634. As in the preceding example, the homogenization zone 634 has a shape substantially symmetrical to that of the zone 614 with respect to an axis perpendicular to the bipolar plate. An axis of this kind is identified by the point O in the figure. A flow path passing through any flow channel 618 is therefore identical to the flow path passing through the channel symmetrically positioned to it with respect to a median plane of the bipolar plate parallel to the plane P. Here the homogenization zones 616 and 617 are delimited by quadrilaterals. The homogenization channels of the homogenization zone 614 then have lengths the order of magnitude of which is relatively close, with the result that the head losses of the flows through them are relatively close.

Figure 8:
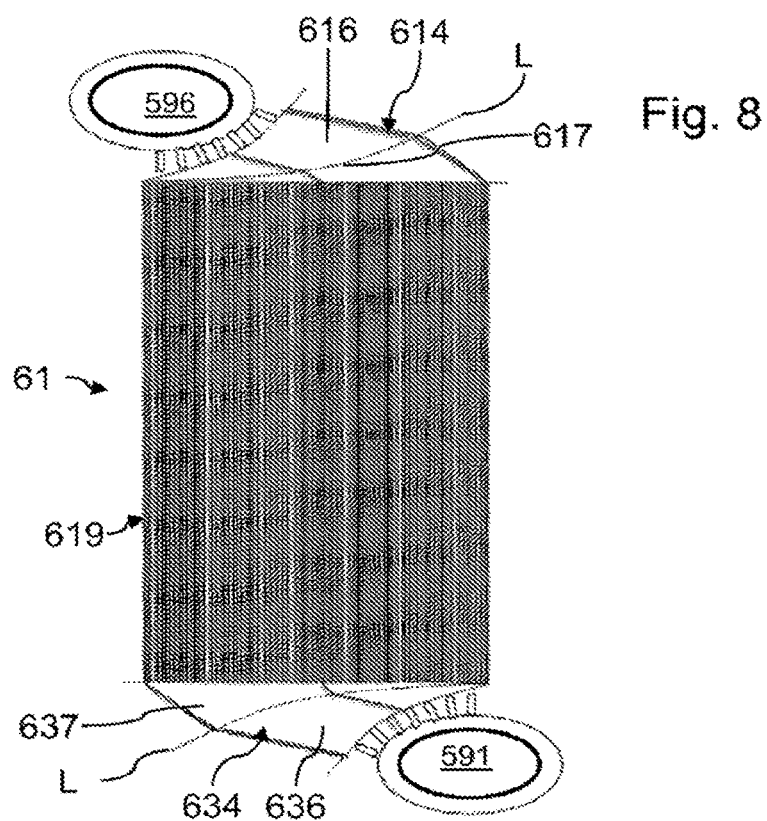

FIG. 8 shows a third design example of the geometry of a homogenization zone 614 or 634. In this example, the junctions between the homogenization channels of the zone 616 and the branches of the homogenization zone 617 are positioned on a curved line. A configuration of this kind is for example intended to match manifolds 596 or 591 of circular or oval section, as shown in this figure.

Figure 10:
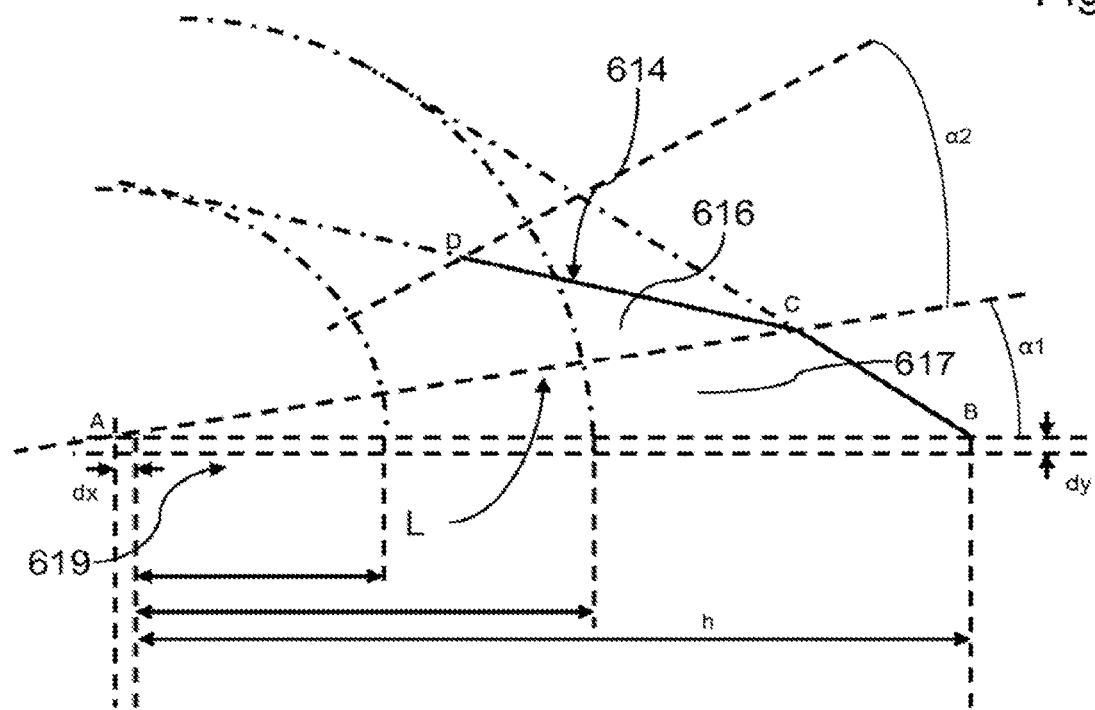
FIG. 10 is a partial top view of a bipolar plate sheet using another variant homogenization zone design.

FIG. 10 shows a fourth design example of the geometry of a homogenization zone 614 or 634. This design also makes it possible to optimize the compactness of the homogenization zones and to guarantee the same cross section in the various homogenization channels and branches of the homogenization channels. In this example, a line A-B passes through the ends of the flow channels 618. A line A-C is drawn secant to the line A-B at the point A. The junctions are arranged along the line A-C. The homogenization zone 617 is therefore positioned between the lines A-B and A-C and to be more precise delimited by a triangle ABC. In this example a line A-D defines the junction between an injection zone (not shown) and the homogenization zone 616, this line being secant to the line A-B at the point A. The homogenization zone 616 is therefore positioned between the lines A-D and A-C and to be more precise delimited by a triangle ADC. Likewise, the homogenization zone 634 may have a similar design, not shown.

The value h defines the total width of the flow channels of the zone 619. The ratio between the width of the channels of the zone 617 and that of the channels of the zone 619 has the value $\varepsilon 1$ ($\varepsilon 1$ will advantageously be between 0.95 and 1.25 inclusive if the channels do not have a strictly equal width). The ratio between the pitch of the channels of the zone 616 and that of the channels of the zone 617 has the value $\varepsilon 2$ ($\varepsilon 2$ will advantageously be between 0.95 and 1.25 inclusive if the channels do not have a strictly equal width). In the example shown, there is an offset dy between the line A-B (showing the end of the homogenization channels of the zone 617) and the channels of the zone 619. Here the point A is also offset laterally a distance dx in order to facilitate drawing the changes of angle of the channels of the zones 616 and 617 close to the point A.

The segment BC can be drawn from the point B by drawing the tangent to the circle of center A and of diameter $h/2 \times \varepsilon 1 + dx$ (here $\varepsilon 1 = 1.1$, for example). The point C is obtained by choosing an angle value $\alpha 1$ between AB and AC (here 10°). The segment CD is drawn from C and by drawing the tangent to the circle of center A and of diameter $h/4 \times \varepsilon 1 \times \varepsilon 2 + dx$ (here $\varepsilon 2 = 1.1$, for example). The point D is obtained by choosing an angle value $\alpha 2$ between AC and AD (here 20°).

The magnitudes dx, dy, $\varepsilon 1$, $\varepsilon 2$, $\alpha 1$, $\alpha 2$ are parameters that make it possible to adjust the geometry of the homogenization zone 614 in order to achieve a compromise between the following criteria:

Area of the quadrilateral ABCD;
Head losses in the homogenization zone 614;
Deviation relative to the mean flow rate in each channel of the zone 619;
Possible coincidence with a facing homogenization zone on the other sheet of the bipolar plate;
Consistency with the dimensions of the exhaust manifolds of the other fluids circulating in the plate.

Figure 9:
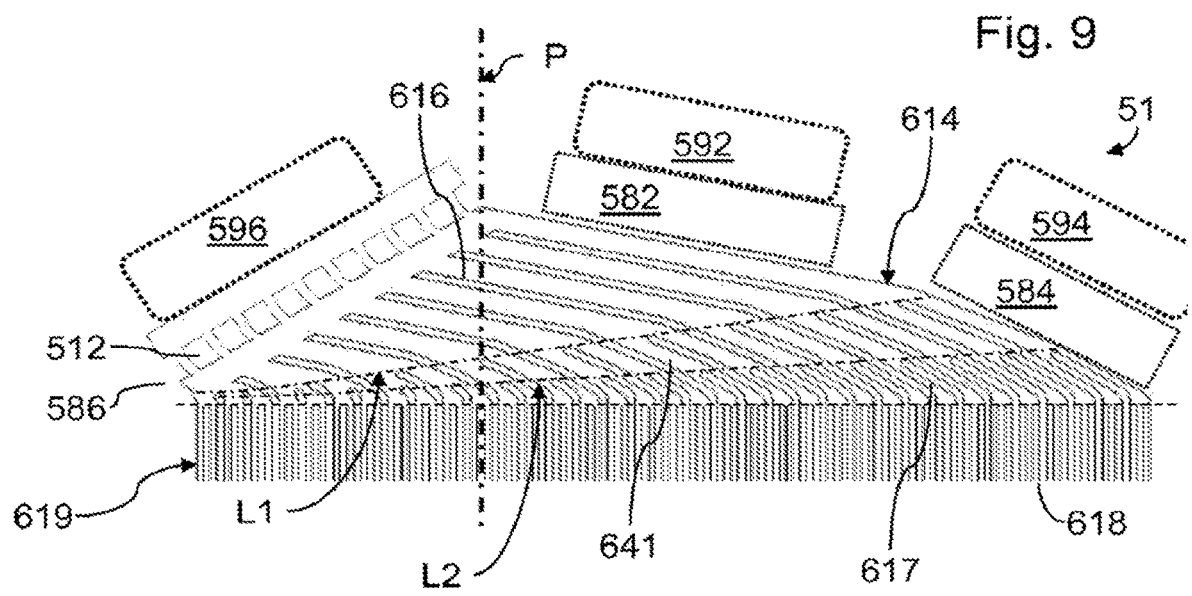
FIG. 9 is a partial top view of one face of a bipolar plate according to a second embodiment of the invention.

The values could advantageously be as follows:
dx=0
dy=0
$\varepsilon 1 = 1$
$\varepsilon 2 = 1$
$\alpha 1 + \alpha 2 = 30°$ Generally speaking, it will be advantageous to comply with the following rules:
$0 < dx < h/10$
$0 < dy < 5$ mm
$10° < \alpha 1 + \alpha 2 < 60°$ FIG. 9 is a diagrammatic partial top view of a sheet 61 of another exemplary embodiment of a bipolar plate 5 according to the invention. In this example, the homogenization zone is divided into three homogenization zones: a zone 616, a zone 641 and a zone 617. The homogenization zone 616 forms a first section and includes homogenization channels into which the injection orifices 512 discharge. The homogenization zone 617 forms a second section including branches discharging into flow channels 618. The homogenization zone 641 forms a third section. The zone 641 forms an intermediary between the homogenization zone 616 and the homogenization zone 617. Each homogenization channel of the zone 616 is divided into a plurality of branches in the zone 641. Each branch of the zone 641 is further divided into a plurality of branches in the zone 617. The line L1 shown is situated at the level of the junctions between the homogenization channels of the zone 616 and the branches of the zone 641. The line L2 shown is situated at the level of the junctions between the branches of the zone 641 and the branches of the zone 617. With a configuration of this kind the angle between the homogenization channels of the zone 616 and the flow channels 618 can be increased to make the homogenization zone 614 even more compact. At the level of each junction there is in this example a division into two branches. Moreover, each branch of the zone 617 discharges into two flow channels 618.

The invention has been described with reference to injection of a dihydrogen type fuel into a fuel cell. The invention of course applies equally to the injection of other types of fuels, for example methanol. The invention has been described with reference to injection of an oxidizer such as air. The invention of course applies equally to the injection of other types of oxidizers, for example oxygen.

The invention has been described with reference to an electrochemical reactor of proton exchange membrane fuel cell type. The invention of course may also apply to other types of electrochemical reactors, for example an electrolyzer also including a stack of bipolar plates and proton exchange membranes.

The invention has been described with reference to examples in which an outer face of the bipolar plate comprising the flow channels and the homogenization channels is defined by the raised pattern of a sheet. Flow channels and homogenization channels as described may equally be produced in a one-piece component defining the two outer faces of the bipolar plate.

The invention claimed is:

1. A bipolar plate for an electrochemical reactor including first and second opposing outer conductive faces, comprising:
   first flow channels formed on the first outer conductive face, extending in a same direction;
   first injection orifices formed in the first outer conductive face;
   a first homogenization zone formed on the first outer conductive face and including homogenization channels,
   each of the homogenization channels sub-dividing into a plurality of branches, each of the homogenization channels including a first section into which one of the first injection orifices discharges and a second section including the plurality of branches discharging into the first flow channels, each of the homogenization channels in the first section connecting one of the first injection orifices to a corresponding plurality of the branches, each of the plurality of branches connecting one of the flow channels to one of the homogenization channels in the first section, and branches in the second section being at an angle of at least 20° relative to a direction of the first flow channels, the homogenization channels in the first section being at an angle of at least 20° relative to a direction of the branches in the second section and at least 40° relative to the direction of the first flow channels, and the homogenization channels in the first section bend away from the first flow channels in a first direction to form a first angle with respect to the first flow channels and the branches in the second section bend away from the first flow channels in the first direction to form a second angle with respect to the first flow channels smaller than the first angle.

2. The bipolar plate as claimed in claim 1, wherein each branch of the plurality of branches of the second section discharges into the first flow channels.

3. The bipolar plate as claimed in claim 1, wherein a cross section of each of the homogenization channels in the first section is identical to a cross section of each of the first flow channels.

4. The bipolar plate as claimed claim 1, wherein a ratio between a cross section of the homogenization channels in the first section and a cross section of the branches of the second section is between 0.95 and 1.25 inclusive, and a cross section of each of the homogenization channels is identical in the first section and in each branch of the second section.

5. The bipolar plate as claimed in claim 1, wherein each branch of the plurality of branches of the second section is in fluid communication with a corresponding single first flow channel.

6. The bipolar plate as claimed in claim 1, further comprising cooling liquid flow channels disposed between the first and second opposing outer conductive faces.

7. The bipolar plate as claimed in claim 1, wherein each of the homogenization channels is divided into the plurality of branches at a level of at least one junction therebetween, a homogenization channel among the homogenization channels being divided into at most three branches at the level of the at least one junction.

8. The bipolar plate as claimed in claim 7, wherein each junction of the at least one junction is disposed in the homogenization channel at a distance from the first injection orifice among the first injection orifices between 0.3* Lch and 0.7* Lch inclusive, wherein Lch is a length of the homogenization channel in which said each junction is disposed.

9. The bipolar plate as claimed in claim 1, through which a flow manifold passes, the first injection orifices establishing fluid communication between the flow manifold and the homogenization channels of the first homogenization zone.

10. The bipolar plate as claimed in claim 1, further comprising first and second conductive sheets fastened together, the first outer conductive face being disposed on the first conductive sheet, the second outer conductive face being disposed on the second conductive sheet.

11. The bipolar plate as claimed in claim 1, further comprising:
second flow channels formed on the second outer conductive face;
second injection orifices formed in the second outer conductive face, the first and second injection orifices being disposed on opposite sides of a plane perpendicular to the bipolar plate and including the same direction of the first flow channels; and
a second homogenization zone formed on the second outer conductive face, superposed on the first homogenization zone, and including additional homogenization channels connecting the second injection orifices to the second flow channels.

12. An electrochemical reactor, comprising:
two bipolar plates according to the bipolar plate claimed in claim 11; and
a membrane-electrodes assembly disposed between the two bipolar plates, the membrane-electrodes assembly including a proton exchange membrane, a first electrode disposed on a first face of the proton exchange membrane and covering the first flow channels of one bipolar plate of the two bipolar plates, a second electrode disposed on a second face of the proton exchange membrane and covering the second flow channels of the other bipolar plate of the two bipolar plates, the membrane-electrodes assembly having no electrodes in vertical alignment with respective homogenization zones of the two bipolar plates.

13. The bipolar plate as claimed in claim 1, further comprising:
third injection orifices formed in the first outer conductive face; and
a third homogenization zone formed on the first outer conductive face, the first and third homogenization zones being disposed at opposite ends of the first flow channels, the third homogenization zone being symmetrical to the first homogenization zone with respect to an axis perpendicular to the bipolar plate.

14. The bipolar plate as claimed in claim 1, further comprising:
third injection orifices formed in the first outer conductive face;
a third homogenization zone formed on the first outer conductive face, the third homogenization zone including homogenization channels each connecting a third injection orifice among the third injection orifices to a plurality of the first flow channels, said homogenization channels of the third homogenization zone; each being divided into a plurality of branches extending from the third injection orifice to one of the first flow channels; and
the first and third homogenization zones being disposed at opposite ends of the first flow channels, a homogenization channel among the homogenization channels after "homogenization channel" of the first homogenization zone and a homogenization channel among the homogenization channels after "homogenization channel" of the third homogenization zone being in fluid communication with a same first flow channel of the plurality of first flow channels and being disposed on opposite sides of a plane perpendicular to the bipolar plate and extending in the direction of the same first flow channel of the plurality of first flow channels.

15. The bipolar plate as claimed in claim 14, wherein the homogenization channels of the third homogenization zone each include a first section with which one of the third injection orifices is in fluid communication, and a second section including a plurality of branches in fluid communication with the first flow channels, branches in the second section being at an angle of at least 20° relative to the direction of the first flow channels, and homogenization channels in the first section being at an angle of at least 20° to the direction of the branches in the second section and at least 40° relative to the direction of the first flow channels.

16. The bipolar plate as claimed in claim 1, wherein an angle between the homogenization channels in the first section and the branches in the second section is less than an angle between the branches in the second section and the first flow channels.

\* \* \* \* \*